(12) United States Patent
Kirkeby et al.

(10) Patent No.: US 7,130,623 B2
(45) Date of Patent: Oct. 31, 2006

(54) REMOTE BROADCAST RECORDING

(75) Inventors: Ole Kirkeby, Espoo (FI); Seppo Pyhälammi, Helsinki (FI)

(73) Assignee: Nokia Corporation, Espoo (FI)

( * ) Notice: Subject to any disclaimer, the term of this patent is extended or adjusted under 35 U.S.C. 154(b) by 511 days.

(21) Appl. No.: 10/417,230

(22) Filed: Apr. 17, 2003

(65) Prior Publication Data

US 2004/0209592 A1    Oct. 21, 2004

(51) Int. Cl.
  *H04M 3/00*  (2006.01)
(52) U.S. Cl. ..................... 455/420; 455/66.1
(58) Field of Classification Search ........ 455/418–420, 455/41.1, 41.2, 41.3, 550.1, 66.1; 725/38, 725/61, 62
See application file for complete search history.

(56) References Cited

U.S. PATENT DOCUMENTS

| | | | |
|---|---|---|---|
| 5,038,401 A | | 8/1991 | Inotsume |
| 5,095,503 A | | 3/1992 | Kowalski |
| 5,739,451 A | | 4/1998 | Winksy et al. |
| 5,870,583 A | | 2/1999 | Maeda |
| 5,946,444 A | | 8/1999 | Evans et al. |
| 6,002,558 A | * | 12/1999 | Rines et al. ............. 360/137 |
| 6,163,711 A | | 12/2000 | Juntunen et al. |
| 6,185,527 B1 | | 2/2001 | Petkovic et al. |
| 6,437,836 B1 | | 8/2002 | Huang et al. |
| 6,570,991 B1 | | 5/2003 | Scheirer et al. |

(Continued)

FOREIGN PATENT DOCUMENTS

EP    0115038    8/1984

EP    1107209 A1    6/2001

(Continued)

OTHER PUBLICATIONS

Z. Liu and Q. Huang, "Detecting news reporting using audio/visual information", pp. 324-328, vol. 3, Proceedings of the 1999 International Conference on Image Processing (ICIP 99), Kobe, Japan, Oct. 24-28, 1999.

(Continued)

*Primary Examiner*—Nguyen T. Vo
(74) *Attorney, Agent, or Firm*—Banner & Witcoff, Ltd.

(57) ABSTRACT

A mobile communication terminal allows a user to receive broadcast programming. A separate recording unit, which can be remote from the communication terminal, records that programming. One or more signals from the mobile terminal identify the broadcast frequency to which the mobile terminal is tuned and cause the recording unit to tune to the identified broadcast frequency. The signals from the mobile terminal also cause the recording unit to record at least a portion of a program being broadcast on the frequency to which the mobile terminal is tuned. The recording unit may buffer portions of broadcast programming being received on the identified frequency. A portion of the buffer contents can subsequently be transmitted to the mobile terminal, permitting the terminal user to replay the portion and identify a start point for the broadcast program. A signal from the mobile terminal can also cause the recording unit to automatically identify the start point in the buffer contents. After the start point is identified by the user or automatically by the recording unit, the recording unit is able to record substantially an entire broadcast program that is identified by the user after the program begins.

41 Claims, 9 Drawing Sheets

U.S. PATENT DOCUMENTS

| | | | |
|---|---|---|---|
| 2002/0059596 A1 | 5/2002 | Sano et al. | |
| 2002/0080286 A1 | 6/2002 | Dagtas et al. | |
| 2003/0081145 A1 | 5/2003 | Seaman et al. | |
| 2003/0101050 A1 | 5/2003 | Khalil et al. | |
| 2003/0163823 A1 | 8/2003 | Logan et al. | |
| 2003/0208762 A1* | 11/2003 | Hanai et al. | 725/58 |
| 2004/0237104 A1* | 11/2004 | Cooper et al. | 725/38 |
| 2005/0010787 A1* | 1/2005 | Tarbouriech | 713/185 |
| 2005/0126369 A1* | 6/2005 | Kirkeby et al. | 84/615 |
| 2006/0026653 A1* | 2/2006 | Matsunami | 725/81 |

FOREIGN PATENT DOCUMENTS

| | | |
|---|---|---|
| EP | WO 2005/088969 A1 * | 9/2005 |
| GB | 2379116 | 2/2003 |
| JP | 2001-333414 | 11/2001 |
| JP | 2002-247468 | 8/2002 |
| WO | WO 02/069148 A1 | 9/2002 |
| WO | WO 02/085004 A1 | 10/2002 |
| WO | WO-03/047172 | 6/2003 |

OTHER PUBLICATIONS

Lie Lu, Hong-Jiang Zhang, Hao Jiang, "Content analysis for audio classification and segmentation", pp. 504-516, IEEE Transactions on Speech and Audio Processing, vol. 10, Issue 7, Oct. 2002.

J. Saunders, "Real-time discrimination of broadcast speech/music", pp. 993-996, vol. 2, ICASSP-96, Proceedings of the 1996 IEEE International Conference on Acoustics, Speech, and Signal Processing, Atlanta, GA, USA, May 7-10, 1996.

L. Tancerel, S. Ragot, V.T. Ruoppila, and R. Lefebvre, "Combined speech and audio coding by discrimination", pp. 154-156, Proceedings of the 2000 IEEE Workshop on Speech Coding, Delavan, WI, USA, Sep. 17-20, 2000.

G. Tzanetakis and P. Cook, "Multifeature audio segmentation for browsing and annotation", pp. 103-106, IEEE Workshop on Applications of Signal Processing to Audio and Acoustics, New Paltz, NY, USA, Oct. 17-20, 1999.

* cited by examiner

REMOTE BROADCAST RECORDING

FIELD OF THE INVENTION

The present invention relates to recording portions of audio or other broadcasts received on a mobile communication terminal, and more specifically, to recording such broadcast portions at a location that may be remote from the mobile communication terminal.

BACKGROUND OF THE INVENTION

Mobile communication devices have become an important part of modern life. Originally, many such terminals only offered wireless telephone service (e.g., a cellular telephone). Increasingly, however, such mobile communication devices are being equipped with a wide variety of features, including games, Internet access, e-mail and other types of services and features. One such feature is the ability to receive broadcast programming such as, e.g., music or other audio information. For example, many mobile terminals are now equipped with an AM/FM radio receiver. A mobile terminal user is thereby able to listen to music, news or other conventional broadcast programming with his or her wireless telephone or other type of mobile terminal.

Although this represents an added convenience for a mobile terminal user, new challenges are presented. One such challenge involves recording a portion of a broadcast. For example, a user may hear a song broadcast by an FM radio station and wish to record the song. However, the primary functions of a mobile terminal (e.g., two-way communication) may require that significant portions of its hardware be dedicated to other uses. The terminal may thus have limited memory and other resources to use for recording. As a general rule, it is also desirable to minimize the size of a mobile terminal so as to enhance its portability and convenience. Without increasing the size of the device, it can be difficult to add significant recording ability to the terminal. Moreover, the quality of audio reception by a mobile terminal can be less than that of a more conventional AM/FM radio. While the decreased audio quality may be acceptable when listening to live programming, the recording process may further degrade the audio quality.

Recording a broadcast program presents other challenges that are not necessarily unique to mobile terminals. Often, a person may not wish to record a song or other broadcast until it has already begun. A person may begin listening to a song, and subsequently decide that he or she would like to record it. Although the person could commence recording at that point, he or she would not be able to record the entire song.

In light of these and other challenges, there remains a need for improved systems and methods for recording broadcasts received on a wireless telephone or other mobile communication terminal.

SUMMARY OF THE INVENTION

The present invention allows a mobile communication terminal user to receive broadcast programming on a mobile terminal, but to record that programming on a separate recording unit. The separate recording unit can be remotely located from the mobile terminal. In one embodiment of the invention, the user receives a broadcast program on his or her mobile terminal. The user can then transmit one or more signals from the mobile terminal that identify the broadcast frequency to which the mobile terminal is tuned, which cause a recording unit to tune to the broadcast frequency, and which cause the recording unit to record at least a portion of the broadcast program which the user is receiving. A signal from the mobile terminal may also cause the recording unit to buffer portions of broadcast programming being received on the identified frequency. In some embodiments, the mobile terminal receives a portion of the buffer contents, and the user then identifies a start point of the broadcast program from within those contents. The start point is then transmitted to the recording unit. In other embodiments, a signal from the mobile terminal causes the recording unit to automatically identify the start point in the buffer contents. After the start point is identified by the user or automatically by the recording unit, the recording unit is able to record substantially an entire broadcast program that is identified by the user after the program begins. Additional features and advantages of the invention are described below and in the drawings, and/or will be apparent from the description and drawings.

DETAILED DESCRIPTION OF THE PREFERRED EMBODIMENTS

As used herein, "mobile terminal" includes cellular and other wireless telephones, mobile devices communicating by General Packet Radio Service to send and receive data, devices permitting wireless Internet telephony, and any other mobile communication device that facilitates wireless two-way communication between a user of the device and another location. "Broadcast station" refers to a broadcaster of programming over an assigned radio frequency within a particular broadcast band, and includes (but is not limited to) conventional AM and FM radio stations, stations broadcasting in short-wave and other bands, and UHF and VHF television stations. "Broadcast programming" refers to information transmitted by such stations, and includes music, news, commercials, sports and any other type of transmission. In order for a signal from a first device to be "received" by a second device, the signal need not reach the second device in an unaltered form. In other words, the signal may be relayed by one or more intermediate devices which change the format of the signal and/or add additional information.

Figure 1:
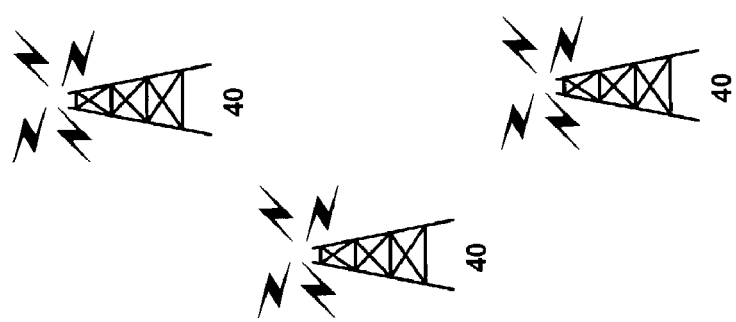
FIG. 1 is a diagram of an architecture for remotely recording audio broadcasts according to one embodiment of the invention.
Figure 1:
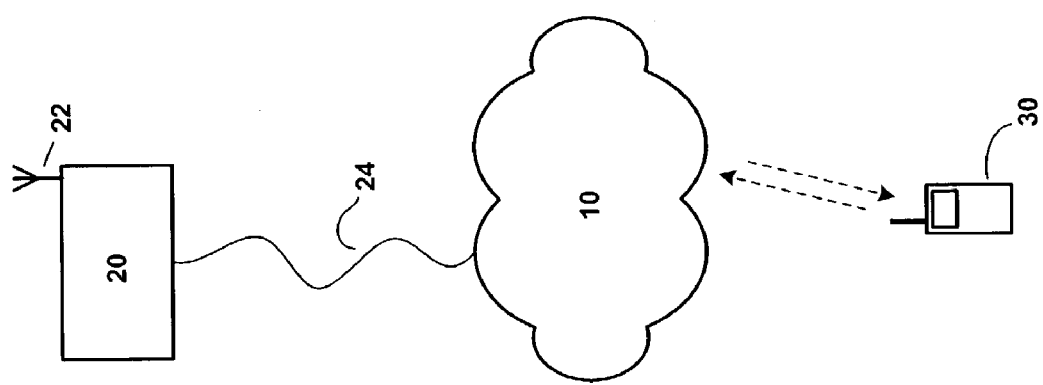

FIG. 1 is a diagram of an architecture for a system for remotely recording audio broadcasts according to one embodiment of the invention. Although the invention is described by an example of a system for recording audio broadcasts from an AM or FM radio station, the invention is also applicable to broadcasts that could include video or other components. Mobile terminal 30 communicates via wireless network 10. Wireless network 10 is represented schematically as a cloud, but includes base stations that transmit and receive wireless communications, and may include switching equipment, connections to other networks, and other components. Because these aspects are known in the art, further description is not needed herein. In addition to providing wireless two-way communication, mobile terminal 30 also receives broadcast radio programming from one or more broadcast stations 40. Mobile terminal 30 selects a broadcast station to receive by tuning to the assigned broadcast frequency for that station.

Also shown in FIG. 1 is a recording unit 20. Recording unit 20 might typically be located in a home, office or other relatively permanent location, although recording unit 20 could also be portable. Recording unit 20 receives communications from mobile terminal 30 via wireless network 10. Recording unit 20 may be directly connected to wireless network 10, but in a preferred embodiment will communicate with wireless network 10 via one or more intermediate networks. Such intermediate networks could include, e.g., wired telephone service and/or the Internet. In some embodiments, recording unit 20 also transmits communications to mobile terminal 30 via wireless network 10 and one or more intermediate networks. Recording unit 20 also receives broadcast programming from broadcast stations 40. In one preferred embodiment, recording unit 20 receives communications from broadcast stations 40 by RF transmission to antenna 22, but in other embodiments may receive such broadcasts via a cable or other wired connection. Network connection 24 may be a conventional telephone connection, an Internet connection, or other communication network connection.

Figure 2:
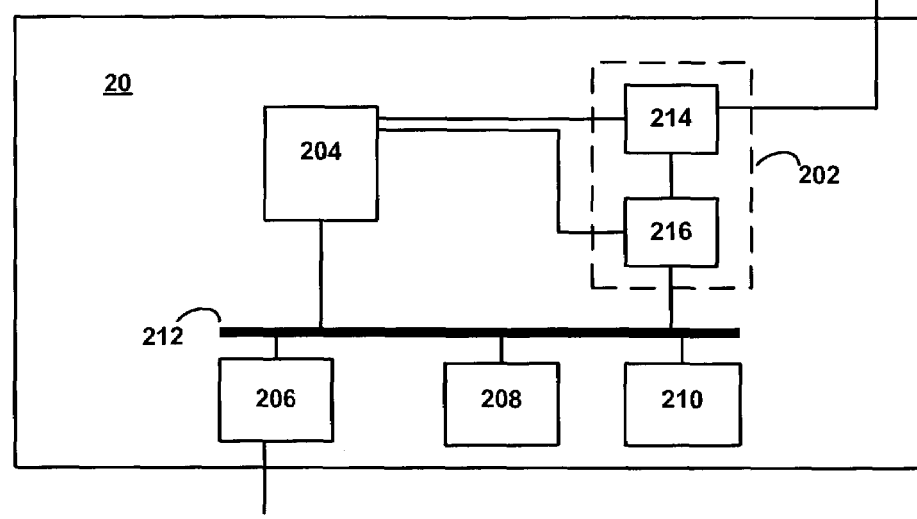
FIG. 2 is a block diagram of a recording unit according to one embodiment of the invention.

FIG. 2 is a diagram showing components of recording unit 20 according to one embodiment of the invention. Recording unit 20 includes an AM/FM receiver 202, a processor 204, a network interface 206, a buffer (or temporary) memory 208 and a storage (or long-term) memory 210. In alternate embodiments, recording unit 20 could include a receiver of transmissions over a TV or other band Receiver 202, processor 204, memories 208 and 210 and network interface 206 are interconnected and communicate via one or more data buses 212. Receiver 202 further includes a tuner 214. Tuner 214, under direction from processor 204, tunes to a particular radio band and frequency, and provides an audio output to digitizer 216. Tuner 214 may also include filters, amplifiers and other components to enhance the quality of the received broadcast. Digitizer 216 converts the analog output from tuner 214 into digitized data in a format such as MP3. The digitized data is then stored in buffer 208 and/or storage memory 210, as described in more detail below. Processor 204 also controls operation of digitizer 216, accesses buffer 208 and accesses storage memory 210. Processor 204 operates according to software instructions, which instructions may also be stored on storage memory 210.

Storage memory 210 is also used for long-term storage of broadcasted music and other programming selected for recording by a user. Buffer 208 is used to temporarily store recent broadcasts (or portions thereof) prior to transferring same to storage memory 210. Storage memory 210 can be a hard disk drive. Buffer 208 may be RAM or other volatile memory, may be a separately partitioned part of storage memory 210, or may be implemented in some other manner. However, the invention is not limited by the type of media in which buffer 208 or storage memory 210 are embodied. Network interface 206 allows recording unit 20 to receive communications from, and optionally transmit communications to, mobile terminal 30. Network interface 206 may be a modem, a network interface card, or other network access device. The particular architecture and arrangement of components shown in FIG. 2 is only one example of a recording unit in accordance with the invention. Additional components may be added, and the above components may be combined and/or perform additional functions. As but one example, receiver 202 may not have a separate digitizer, and processor 204 may digitize the audio output from tuner 214. Additional processors and/or memory could be added, as discussed below.

Figure 3:
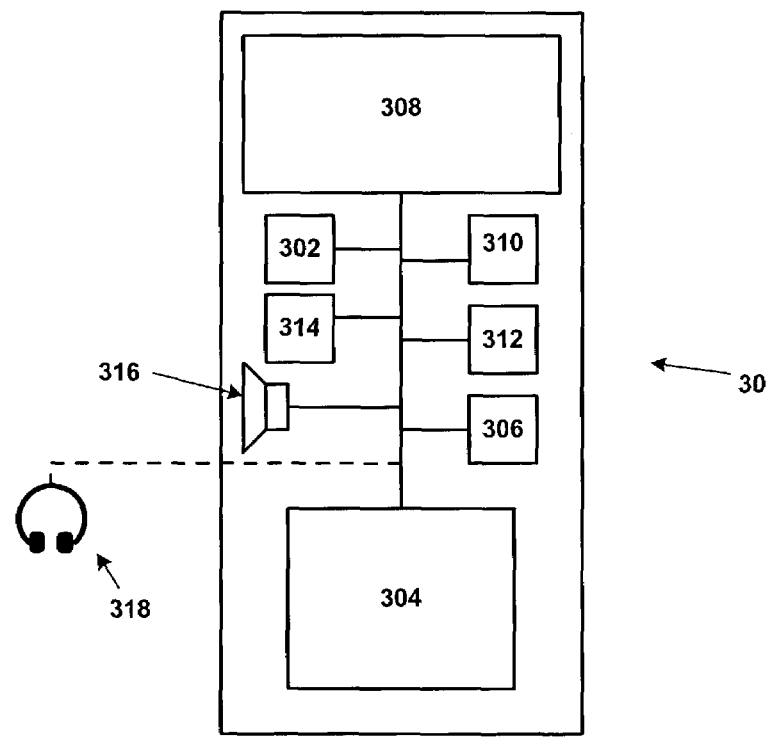
FIG. 3 is a block diagram of a mobile terminal according to one embodiment of the invention.

FIG. 3 is a functional diagram of a mobile terminal 30 according to one embodiment of the invention. Mobile terminal 30 generally includes a communications interface 302, inputs (e.g., keypad 304 and audio/visual inputs 306), display 308, memory 310, processor 312 and broadcast receiver 314. Communications interface 302 includes components needed to transmit and receive information (whether voice, data or other information) via wireless network 10. Audio/visual inputs 306 may include, e.g., a microphone and/or a camera. A user of the mobile terminal 30 provides input via keypad 304 to access features of mobile terminal 30. Operation of mobile terminal 30 is controlled by a processor 312, which receives instructions and data from, and stores data to, memory 310. Mobile terminal 30 further includes a broadcast receiver 314. Broadcast receiver 314 tunes to a frequency of a desired broadcast station, and provides audio output via a speaker 316 or headset 318. In other embodiments, broadcast receiver 314 could also provide video or other types of output via, e.g., display 308. As with the recording unit in FIG. 2, the mobile terminal shown in FIG. 3 is only one example of a possible mobile terminal in accordance with the invention.

The system shown in FIG. 1 allows a user of mobile terminal 30 to store AM, FM or other broadcast programming transmissions while listening to that programming on mobile terminal 30. Although the user might be listening to the broadcast on mobile terminal 30, the broadcast is recorded by recording unit 20, which can be remotely located from mobile terminal 30. The user can, while receiving a broadcast transmission via mobile terminal 30, send a notification to the recording unit 20 via wireless network 10. The notification instructs the recording unit to store the current broadcast transmission of a designated broadcast frequency. The broadcasted transmission is stored at recording unit 20, and can be replayed later or transferred to storage on another device. For example, the recording could be transferred over a BLUETOOTH link (as described in, e.g., "Specification of the Bluetooth System," version 1.1, dated Feb. 22, 2001, available from Bluetooth SIG, Inc. at <http://www.bluetooth.com>) to an MP3 player or other device.

Upon activation of the broadcast receiver 314 of mobile terminal 30, a signal may be sent via wireless network 10 to recording unit 20. That signal informs recording unit 20 that mobile terminal 30 has tuned to a particular broadcast frequency. Recording unit processor 204 then causes recording unit tuner 214 to tune to the same frequency. In one preferred embodiment, mobile processor 312 automatically sends a signal to recording unit 20 upon a user tuning the broadcast receiver 314 to a particular station. For example, mobile processor 312 could, upon the broadcast receiver 314 being tuned to a particular station for a certain time period (e.g., 10 seconds), determine that the user has elected to listen to that station. Mobile processor 312 could then transmit a signal on wireless network 10 containing the identity of recording unit 20 and the identity of the tuned frequency. When the user tunes to a different frequency, a subsequent signal can be transmitted containing the new frequency. Upon receipt of that signal, recording unit 20 then tunes to the new frequency.

At some point in time while listening to a broadcast, a user may decide that he or she wishes to record the current programming. The user then causes mobile terminal 30 to send a "record" signal via wireless network 10. Upon receipt of the record signal, recording unit processor 204 causes the output from digitizer 216 to be stored in buffer 208 and/or storage memory 210. Subsequently, mobile terminal 30 may send (either automatically or at request of the user) a "stop record" signal. Upon receipt of this signal, recording unit processor 204 causes the output of digitizer 216 to no longer be stored. Optionally, processor 204 may also mark the stored programming with the time of recording and frequency, or with other indicia provided by a user or software instructions.

Alternatively, recording unit 20 could commence storing broadcast programming upon initial receipt of a notification signal indicating that mobile terminal 30 has been tuned to a particular frequency. Upon receipt of the notification signal, recording unit 20 could tune to the designated frequency, and the output of digitizer 216 could be immediately written into buffer 208. In one embodiment, buffer 208 only stores programming received within a recent time period (e.g., the last 30 minutes). If at the end of that time period no indication is received from mobile terminal 30 that a user would like to record broadcast programming, the output of digitizer 216 overwrites the oldest portion of the programming in buffer 208. If a user does wish to record programming to which he or she is listening on mobile terminal 30, the user may then cause mobile terminal 30 to send a record signal to recording unit 20 via wireless network 10. Upon receipt of the record signal, recording unit processor 204 may then mark the contents of buffer 208 for later storage in storage memory 210. If the length of the program which the user desires to record exceeds the buffer size (i.e., the time from the record signal to the stop record signal is such that one portion of the program to be recorded would overwrite a previously buffered portion), the output of digitizer 216 could be stored directly to storage memory 210. Alternately, the length of the buffer time period could be expanded.

By automatically buffering the digitizer output prior to receiving a record instruction, a user is also able to "steal time," i.e., commence recording an entire program after the program has begun. For example, a user might tune mobile terminal 30 to a particular radio station and begin listening to a particular song. After the song begins, the user could then decide that he or she likes the song, and would like to record it for future enjoyment. The user could then press an appropriate key (or key combination) on mobile terminal keypad 304, which could cause processor 312 to send a record signal to recording unit 20 over wireless network 10. Upon receipt of the record signal, recording unit 20 then stores the contents of buffer 208 in storage memory 210, as well as all future output of digitizer 216 until a stop record signal is received. The user may then subsequently edit the contents of storage memory 210 to only retain the desired program. Alternatively, the beginning of the program could be identified in the contents of buffer 208. Only the desired contents would then be transferred to storage memory 210 and added to the portion of the program received subsequent to the record signal.

The desired portion of the buffer contents could be identified in various manners. In a "manual" alternative, the recording unit could select a predefined portion of the buffer (e.g., the most recent 30 seconds, 1 minute, 5 minutes, etc.) and transmit that portion to the mobile terminal. This portion is then temporarily stored in mobile terminal memory 310. The user of the mobile terminal could then replay that portion and mark where he or she would like the recording to begin. The marked beginning point is then transmitted via wireless network 10 to recording unit 20 (which has continued to record the program), and the appropriate portion of buffer 208 transferred to storage memory 210. In one embodiment, an ongoing connection between mobile terminal 30 and recording unit 20 would be maintained over wireless network 10 so that the various actions of the devices could be synchronized in real time. This connection could be provided with a GPRS or SIP connection, or in another manner.

In an "automatic" alternative, the recording unit would automatically locate the start point of the desired program in buffer 208. Upon receiving a record signal from mobile terminal 30, recording unit processor 204 would analyse the contents of buffer 208, locate a discontinuity point corresponding to the beginning of the current program, and mark the buffer contents from that point forward for subsequent transfer to storage memory 210. Optionally, the processor could automatically identify the end of the program.

Various methods exist for automatically identifying the starting and ending points of an audio program. In particular, much effort has been devoted to developing methods for discriminating between speech and music. A typical speech/music discriminator first splits up the audio signal into short frames (e.g., 20 ms–50 ms duration). A number of primitive features are extracted from each frame, and a history of these features (e.g., going back 0.5 s), is used to determine whether the source signal is most likely speech or music. Examples of time domain primitive features include zero-crossing rate, energy (total or rms), envelope data (related to the smoothed energy-contour), histogram data (related to the probability density function), and peak data (related to the extremas of the wave form). Examples of frequency domain primitive features include spectral centroid (a crude measure of the spectrum's "tilt"), spectral flatness (inversely proportional to the variance), cepstral data, and histogram or peak data extracted from the magnitude spectrum. The variation in the primitive features over a significant number of frames is used to analyze the trends in the audio signal. For example, to a speech/music discriminator a high percentage of low-energy frames is likely to indicate the pauses in speech whereas a high variation in the energy between frames is likely to indicate the transients often found in music. In a similar way other types of program material can also be classified by analysing a number of primitive features extracted from the audio signal. However, the purpose of the analysis is not necessarily to classify the program material. The starting and end points can also be determined by detecting changes within the audio signal. For example, if a slow or mellow music piece is followed by a loud rock song, it is sufficient to know when the transition occurred. In this case there is no need to evaluate the more detailed characteristics of the two music pieces in order to find the starting and ending points.

FIGS. 4A through 5F illustrate operation of these alternatives. In FIGS. 4A through 5F, two music programs being broadcast (identified as "song A" and "song B") are represented as variable length horizontal bars. As the song is played, the corresponding bar moves to the right. The current time is shown by the leftmost arrowhead and vertical dashed line. The portion of the song A or song B bar to the right of the first arrowhead represents portions of a program that have already been broadcast, while the portion of the bar to the left of the arrowhead represents portions of a program that have yet to be broadcast. The distance from the left arrowhead and vertical line to the rightmost arrowhead and vertical line represents the time period of the broadcast that is stored in buffer 208. Although music programs are used for purposes of illustration in FIGS. 4A through 5F, the invention is applicable to any type of broadcast programming.

Figure 4A:
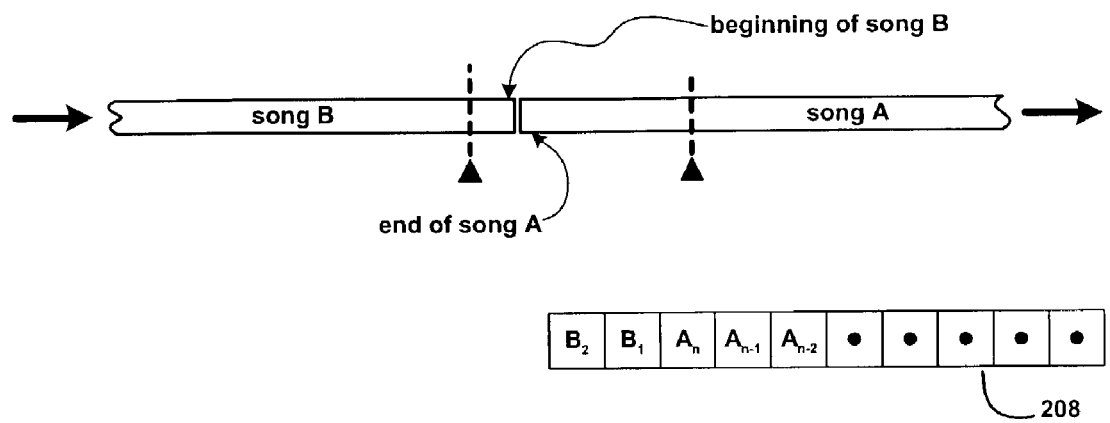
FIGS. 4A–4F are diagrams explaining recording of a broadcast program according to one aspect of the invention.
Figure 4B:
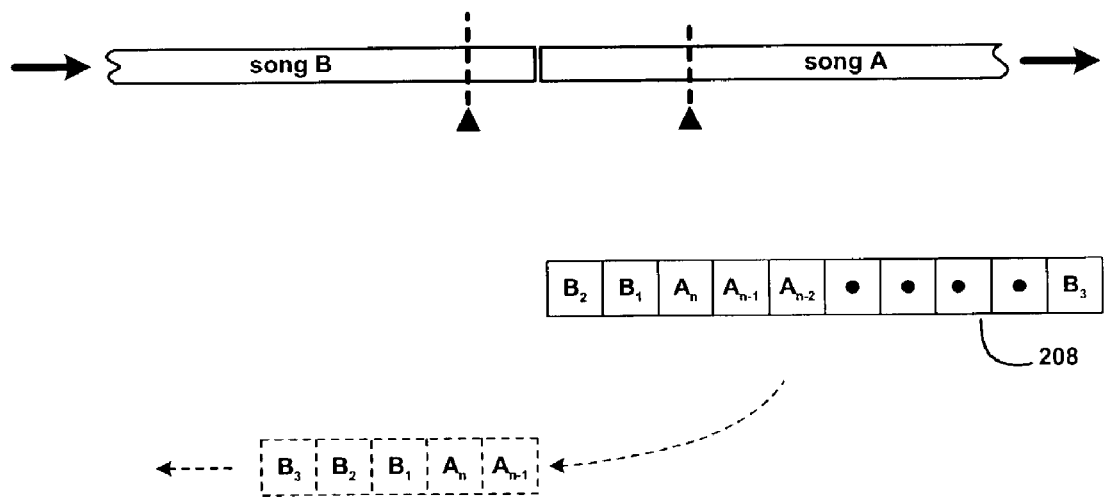
Figure 4C:
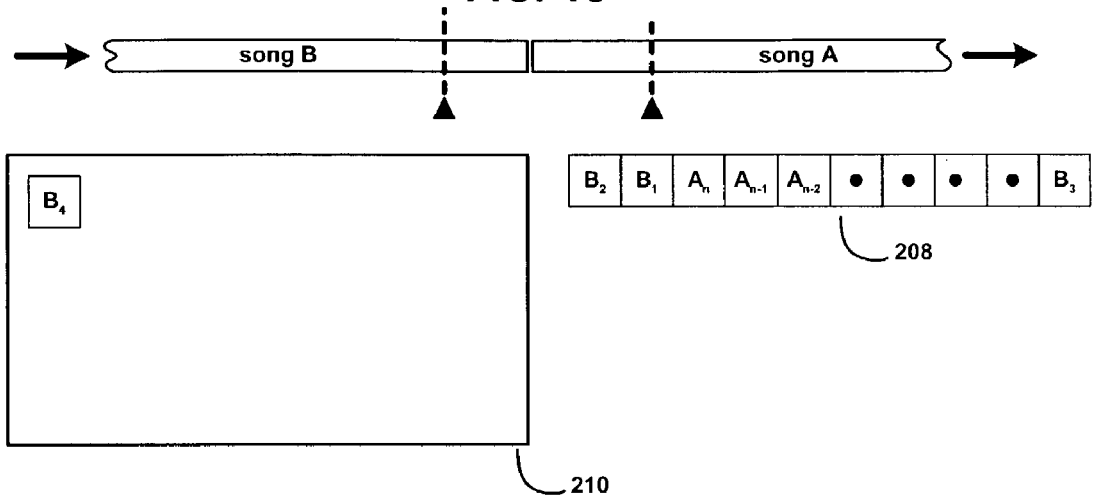
Figure 4D:
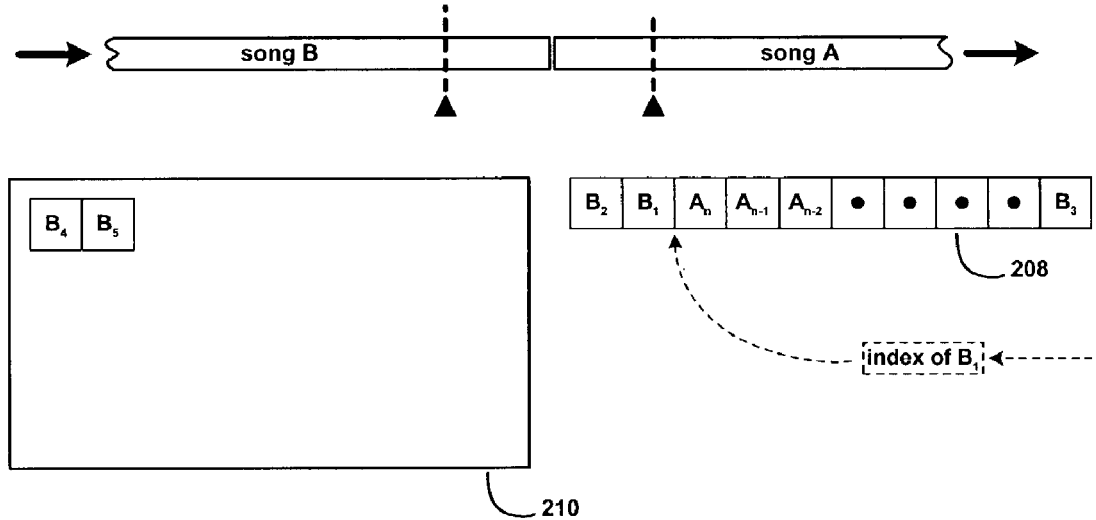
Figure 4E:
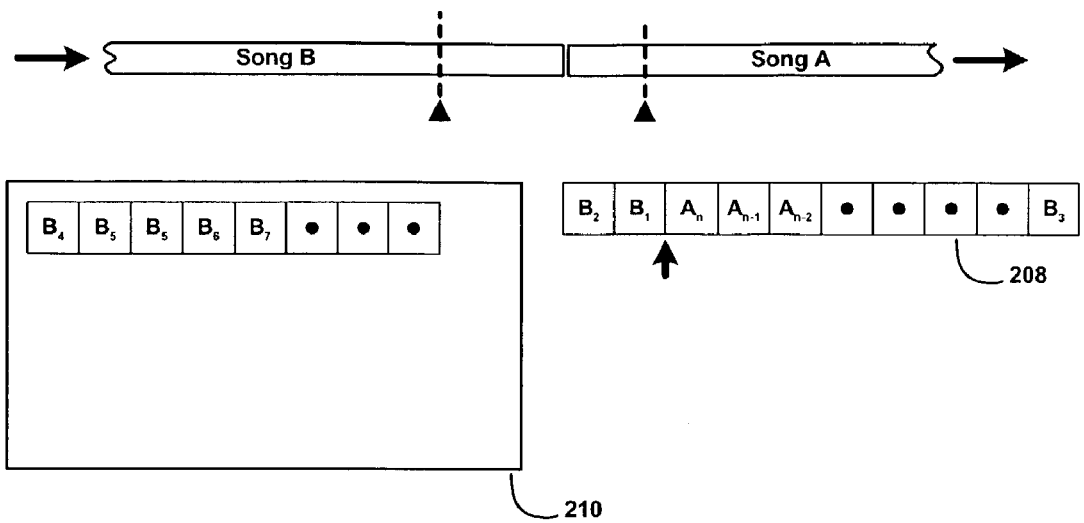
Figure 4F:
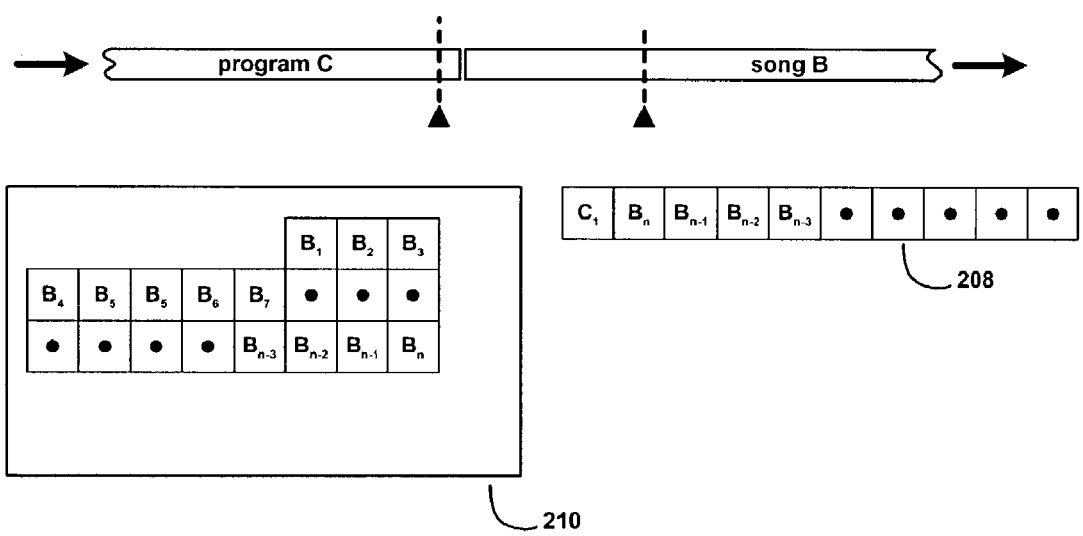

Manual location of a program starting point is shown in FIGS. 4A through 4F. Beginning with FIG. 4A, song B has just begun, and song A has just concluded. Accordingly, the contents of buffer 208 correspond to the portion of song B from the beginning of that song to the left arrowhead, as well as the portion of song A from the end of song A to the right arrowhead. The buffer contents are shown in diagrammatic form as $B_2$, $B_1$, $A_n$, $A_{n-1}$, etc. In particular, $B_1$ is the digitized first portion of song B and $B_2$ is the digitized second portion of song B. $A_n$ is the digitized last portion of song A, $A_{n-1}$ the digitized second-to-last portion of song A, etc. FIG. 4B corresponds to a subsequent point in time. An additional part of song B has been broadcast, and the digitized form of that portion ($B_3$) placed in buffer 208 so as to overwrite the oldest part of song A in buffer 208. At this moment, the mobile terminal user decides that he or she would like to record song B. The user presses the appropriate key(s) on the mobile terminal, causing a record signal to be sent to recording unit 20. Upon receipt of the record signal, recording unit 20 transmits a portion of the contents of buffer 208 that corresponds to a predetermined amount of time prior to receiving the record signal. In this case, the transmitted portion contains $B_1$ through $B_3$ and $A_n$ through $A_{n-1}$. As shown in FIG. 4C, the recording unit stops overwriting song B into buffer 208 and begins to directly store song B into storage memory 210. The digitized portion $B_4$ of song B has been stored in storage memory 210. FIG. 4D corresponds to a subsequent point in time in which the user has identified the start of song B and transmitted same to the recording unit. Communication of the location of the beginning of song B is shown as a block labeled "index of $B_1$." The location of the start of song B is marked, and the remainder of song B continues to be recorded into storage memory 210 (FIGS. 4D and 4E). The location of $B_3$ would already be known, as it would be at the end of the portion of the buffer contents previously sent to mobile terminal 30 for review by the user. When the user hears the end of song B, he or she may then send a stop record signal to the recording unit. At that time, the portion of song B in buffer 208 is transferred to storage memory 210 and appended to the later portion already stored (FIG. 4F). As also shown in FIG. 4F, the recording unit then resumes writing the most recent portion of the broadcast in buffer 208.

In one variation on the operation shown in FIGS. 4A through 4F, the recording unit would not directly store the broadcast program into storage memory 210, and would continue to write song B to buffer 208 after sending a portion of the buffer contents to the mobile terminal for review by the user. In this variation, when the end of the buffer is reached (i.e., as the user-marked beginning of song B is neared), the contents of the buffer would be transferred to storage memory 210, and the subsequently-broadcast portions of song B would then be overwritten on the earlier portions. Parallel processors and/or buffers could also be used so that no portion of song B is missed while the contents of buffer 208 are transferred.

Figure 5A:
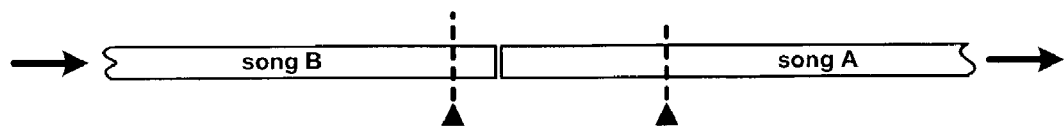
FIGS. 5A–5F are diagrams explaining recording of a broadcast program according to another aspect of the invention.
Figure 5A:
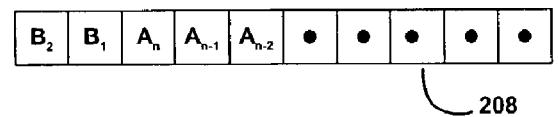
Figure 5B:
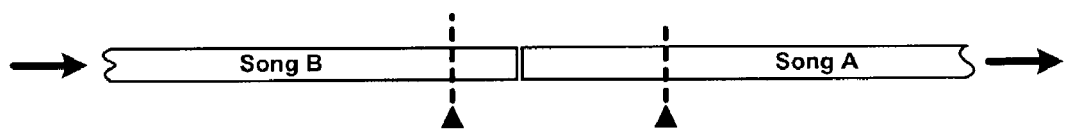
Figure 5B:
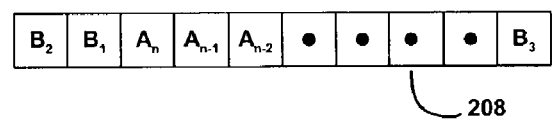
Figure 5B:
Figure 5C:
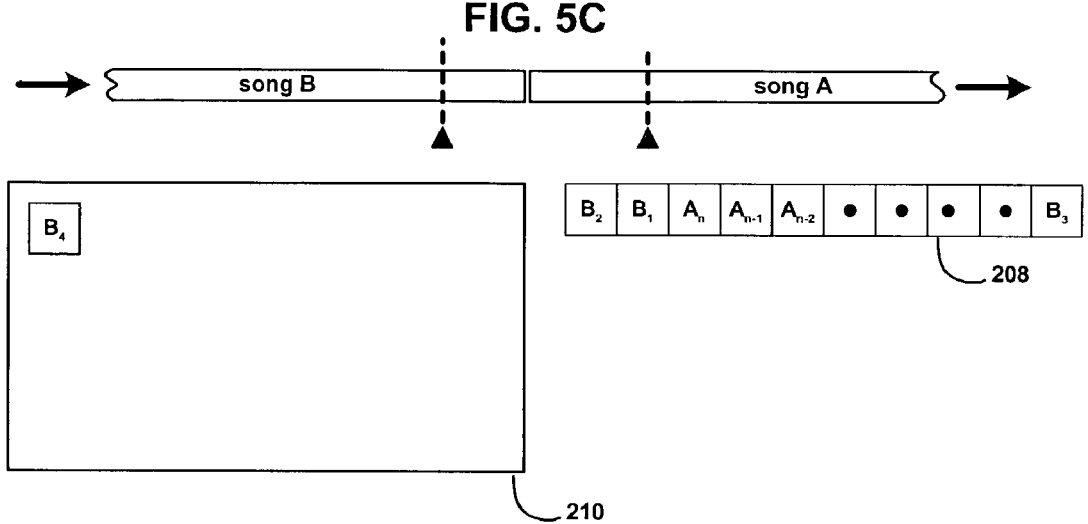
Figure 5D:
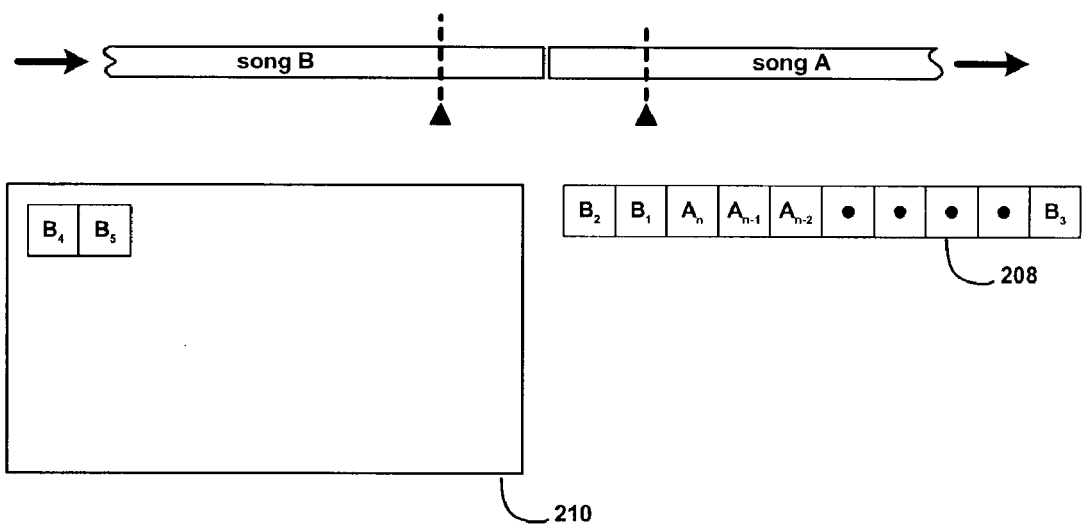
Figure 5E:
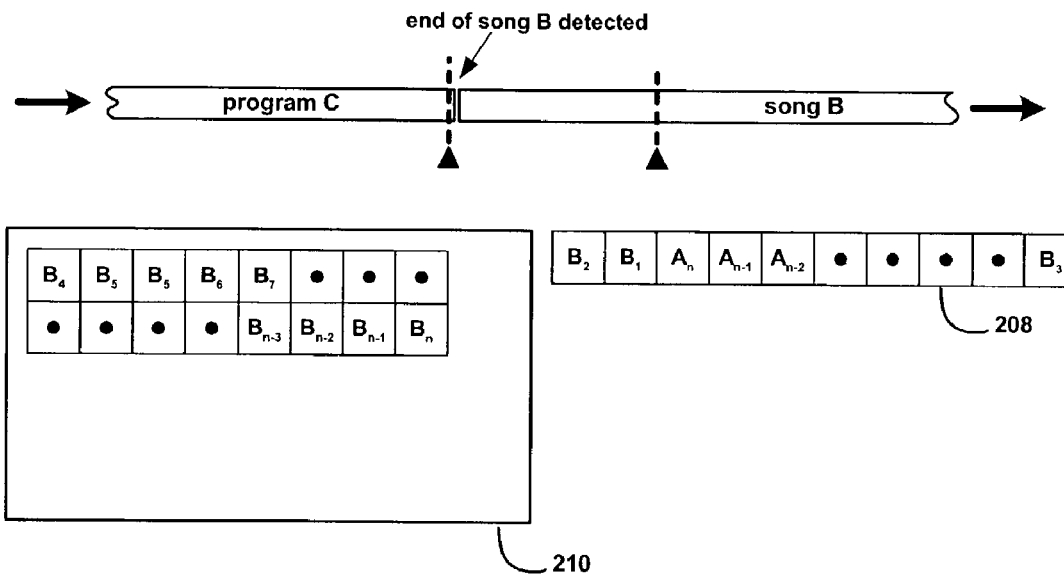
Figure 5F:
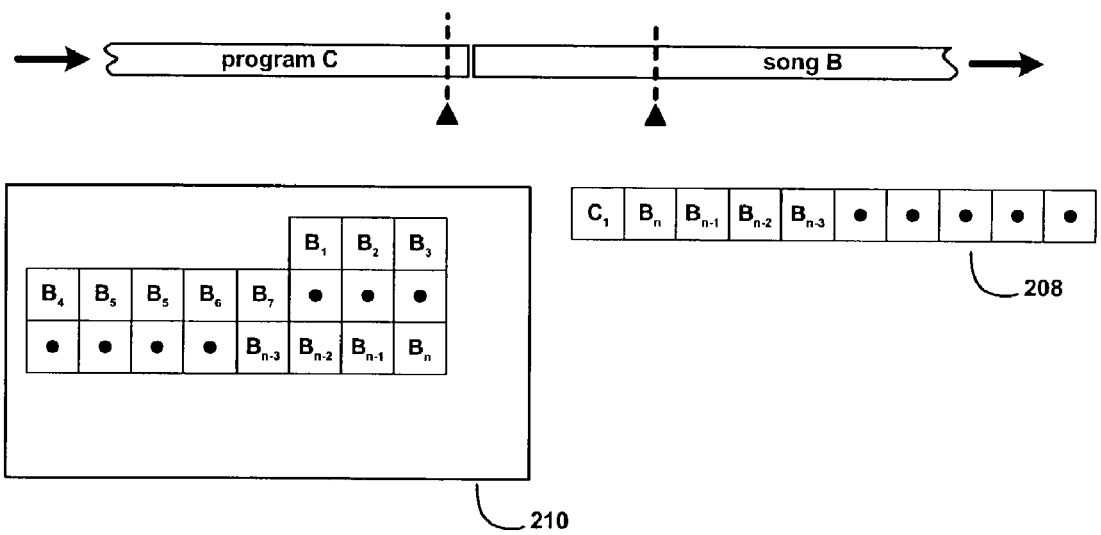

Automatic location of starting and ending points is shown in FIGS. 5A through 5F. FIG. 5A is similar to FIG. 4A, and shows that song B has just begun, as well as the contents of buffer 208. In FIG. 5B, the recording unit receives a record signal from a mobile terminal. From that point in time forward, as shown in FIGS. 5C and 5D, digitized portions of song B are stored directly in storage memory 210. Processor 204 of recording unit 20 continuously analyzes the output of digitizer 216. Upon detecting the end of song B, and as shown in FIG. 5E, processor 204 locates the beginning of song B in buffer 208, and then appends the buffered portion of song B to the portion already stored in storage memory 210 (FIG. 5F).

In one variation upon the operation shown by FIGS. 5A through 5F, processor 204 could immediately locate the beginning of song B in buffer 208 and transfer the buffered portion of song B to storage memory 210 prior to completion of the broadcast of song B. In another variation, the recording unit can automatically determine the starting point of the song, but be advised of the ending point by a subsequent signal from the user. So as to avoid loss of a program portion while buffer contents are being analyzed or transferred, recording unit 20 could be implemented with parallel processors and/or buffers so that portions of a broadcast could be analyzed or buffered while other portions are transferred to (or originally placed in) storage memory 210.

Figure 6:
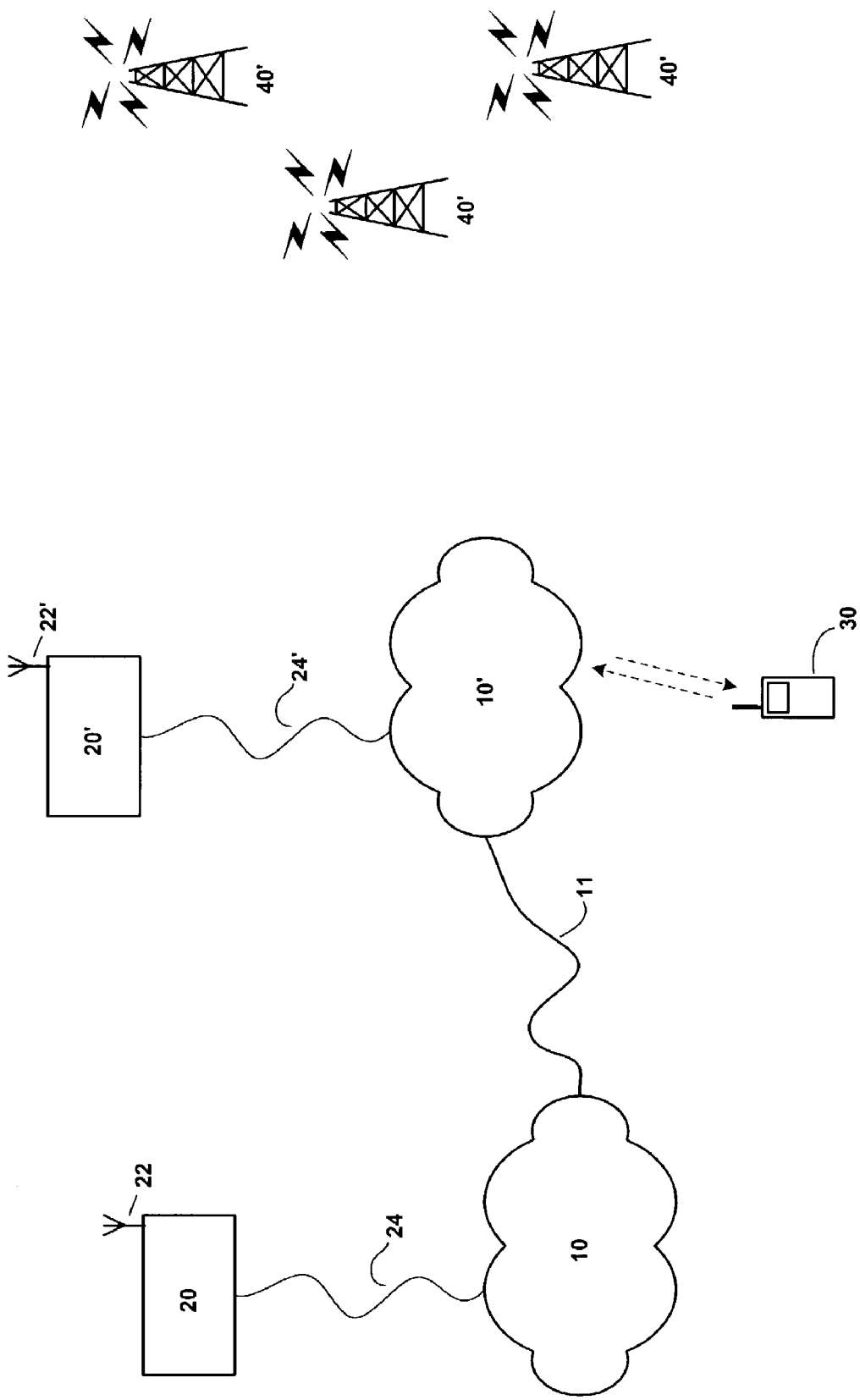
FIG. 6 is a diagram of an alternative architecture for remotely recording audio broadcasts according to another embodiment of the invention.

FIG. 6 shows another embodiment of the invention. Mobile terminal 30, recording unit 20 and wireless network 10 are substantially similar to mobile terminal 30, recording unit 20 and wireless network 10 as shown in FIG. 1. Also shown in FIG. 6 is a second wireless network 10' connected to wireless network 10 by inter-network connection 11. Recording unit 20' is connected to network 10' by connection 24', and is able to receive transmissions from broadcast stations 40'. As shown in FIG. 6, mobile communication terminal 30 is now located in a region in which mobile terminal 30 is within range of (and able to receive transmissions from) broadcast stations 40', but recording unit 20 is not. If mobile terminal 30 sent a signal to recording unit 20 indicating the station to which mobile terminal 30 is tuned, recording unit 20 would be unable to tune to (or record transmissions from) that station. FIG. 6 represents a situation which could occur if, e.g., a mobile terminal is roaming outside of its home wireless network. Accordingly, another recording unit 20' is temporarily assigned to mobile terminal 30 while operating in wireless network 20'. Recording unit 20' could be assigned by network 10' directly. For example, network 10' could recognize that mobile terminal 30 is roaming and assign a recording unit based on the phone number, IP address or other identifier of the mobile terminal. Alternatively, the home network 10 could, upon recognition that mobile terminal 30 is operating from another network, communicate to network 10' via inter-network connection 11 and request that a recording unit be assigned. Recording unit 20' could record transmissions for mobile terminal 30 in a manner similar to one of the alternatives previously described in connection with FIGS. 1–5F. The previously-described signals between mobile terminal 30 and recording unit 20 would instead be exchanged between mobile terminal 30 and recording unit 20'. When mobile terminal 30 is no longer within network 10', network 10' could transmit the material recorded for mobile terminal 30 by recording unit 20' to network 10, which could then transfer that recorded material to recording unit 20.

In yet another embodiment, recording unit 20 (or 20') could transmit an entire song or other program to mobile terminal 30, and not just a portion of a song or other program. In this manner, a user of mobile terminal 30 could access pre-recorded programming when he or she is unable to find desirable programming currently be broadcast by a broadcast station.

Although specific examples of carrying out the invention have been described, those skilled in the art will appreciate that there are numerous variations and permutations of the above-described systems and methods that are contained within the spirit and scope of the invention as set forth in the appended claims. For example, a recording unit and/or mobile terminal could be configured so that a user could choose between the manual and automatic recording modes described above. The various buffer sizes, time periods and other operating parameters described above could be configurable by a user. A mobile terminal could further be configured such that, if switched off while a broadcast program is being recorded, the mobile terminal would automatically send a stop record signal to the recording unit. Alternatively, the recording unit could be configured to automatically stop recording a program after a time out period during which no further signal is received from the mobile terminal. As yet another possible alternative, a single recording unit could record transmissions for multiple mobile terminals. As yet a further alternative, a machine-readable medium could have machine-executable instructions stored thereon such that, when the instructions are read and executed by an appropriate device (or devices), steps of a method according to the invention are performed. These and other modifications are within the scope of the invention as defined in the attached claims.

We claim:

1. A method of remotely storing broadcast programming received by a mobile communication terminal, comprising:
   receiving a broadcast program on a mobile communication terminal; and
   transmitting one or more signals from the mobile communication terminal, the signals:
      identifying a broadcast frequency on which the broadcast program is received by the mobile terminal,
      causing a recording unit to tune to the broadcast frequency, and
      causing the recording unit to record at least a portion of the broadcast program.

2. The method of claim 1, wherein transmitting one or more signals comprises transmitting an activation signal, and wherein the activation signal identifies the broadcast frequency and causes the recording unit to tune to the broadcast frequency.

3. The method of claim 2, further comprising transmitting a stop recording signal automatically upon deactivation of the mobile terminal, the stop recording signal causing the recording unit to cease recording the at least a portion of the broadcast program.

4. The method of claim 2, further comprising:
   tuning the mobile terminal to a second broadcast frequency; and
   transmitting a second activation signal, the second activation signal identifying the second broadcast frequency and causing the recording unit to tune to the second broadcast frequency.

5. The method of claim 2, wherein the one or more signals further comprise a recording signal, wherein the activation signal further causes the recording unit to commence writing programming received on the broadcast frequency into a buffer, and wherein the recording signal indicates that a portion of the buffer contents are to be stored in a separate memory location.

6. The method of claim 5, further comprising:
   receiving at the mobile communication terminal a portion of the buffer contents;
   identifying within the buffer contents portion a starting point for the at least a portion of a broadcast program; and
   transmitting a second recording signal containing the starting point.

7. The method of claim 6, further comprising transmitting a stop recording signal, the stop recording signal indicating to the recording unit that no additional portions of the broadcast program are to be stored in the separate memory location.

8. The method of claim 5, wherein the recording signal is transmitted after commencement of the at least a portion of a broadcast program, and wherein the recording signal causes the recording unit to identify a start point in the buffer contents, the start point corresponding to the commencement of the at least a portion of a broadcast program.

9. The method of claim 8, wherein the recording signal further causes the recording unit to store in the separate memory location buffer contents written subsequent to the writing of the start point.

10. The method of claim 8, wherein:
    the recording signal causes the recording unit to identify the conclusion of the at least a portion of a broadcast program, and
    the recording signal causes the recording unit to store in the separate memory location substantially the entire at least a portion of a broadcast program.

11. The method of claim 1, wherein identifying a broadcast frequency comprises determining that the mobile communication terminal has been tuned to the frequency for a predetermined time period.

12. The method of claim 1, further comprising sending a transfer signal causing the recording unit to transfer the recorded at least a portion of the broadcast program to a second recording unit.

13. The method of claim 12, wherein sending a transfer signal comprises sending a signal indicative of the mobile communication terminal no longer operating within a first wireless network, and wherein the transfer signal causes the recording unit to transfer the recorded at least a portion of the broadcast program to a second recording unit in a second wireless network.

14. A mobile communication terminal, comprising:
    a communications interface adapted to provide two-way communication via a wireless network between the mobile communication terminal and other locations;
    an input device;
    a receiver for tuning to broadcast radio frequencies and receiving broadcast programming; and
    a processor configured to transmit, via the communications interface, one or more signals:
       identifying a broadcast frequency on which a broadcast program is being received by the mobile terminal,
       causing a recording unit to tune to the broadcast frequency, and
       causing the recording unit to record at least a portion of the broadcast program.

15. The mobile communication terminal of claim 14, wherein the one or more signals comprise an activation signal, and wherein the activation signal identifies the broadcast frequency and causes the recording unit to tune to the broadcast frequency.

16. The mobile communication terminal of claim 15, wherein the processor is further configured to transmit a stop recording signal automatically upon deactivation of the mobile terminal, the stop recording signal causing the recording unit to cease recording the at least a portion of the broadcast program.

17. The mobile communication terminal of claim 15, wherein the processor is further configured, upon tuning the receiver to a second broadcast frequency, to transmit a second activation signal, the second activation signal identifying the second broadcast frequency and causing the recording unit to tune to the second broadcast frequency.

18. The mobile communication terminal of claim 15, wherein the one or more signals further comprise a recording signal, wherein the activation signal further causes the recording unit to commence writing programming received on the broadcast frequency into a buffer, and wherein the recording signal indicates that a portion of the buffer contents are to be stored in a separate memory location.

19. The mobile communication terminal of claim 18, wherein the processor is further configured to:
 receive a portion of the buffer contents;
 identify, in response to a user instruction and from within the buffer contents portion, a starting point for the at least a portion of a broadcast program; and
 transmit a second recording signal containing the starting point.

20. The mobile communication terminal of claim 19, wherein the processor is further configured to transmit a stop recording signal upon receipt of a user instruction, the stop recording signal indicating to the recording unit that no additional portions of the broadcast program are to be stored in the separate memory location.

21. The mobile communication terminal of claim 18, wherein the processor is configured to transmit a play signal causing at least a portion of a broadcast program stored in the separate memory location to be played by the mobile communication terminal.

22. The mobile communication terminal of claim 18, wherein the processor is configured to transmit the recording signal after commencement of the at least a portion of a broadcast program, and wherein the recording signal causes the recording unit to automatically identify a start point in the buffer contents, the start point corresponding to the commencement of the at least a portion of a broadcast program.

23. The mobile communication terminal of claim 22, wherein the recording signal further causes the recording unit to store in the separate memory location buffer contents written subsequent to the writing of the start point.

24. The mobile communication terminal of claim 22, wherein:
 the recording signal causes the recording unit to automatically identify the conclusion of the at least a portion of a broadcast program, and
 the recording signal causes the recording unit to automatically store in the separate memory location substantially the entire at least a portion of a broadcast program.

25. The mobile communication terminal of claim 18, wherein the processor is configured to transmit multiple types of recording signals, and wherein the processor is further configured to:
 transmit a manual recording signal, the manual recording signal causing transmission of at least a portion of the buffer contents to the mobile communication terminal, replay on the mobile communication terminal, in response to a user instruction, a portion of the at least a portion of a broadcast program corresponding to the portion of the buffer contents,
 transmit, in response to a user instruction, a second manual recording signal containing a starting point for the at least a portion of a broadcast program from within the buffer contents portion, and
 transmit an automatic recording signal after commencement of a broadcast program, the automatic recording signal causing the recording unit to automatically identify a start point in the buffer contents.

26. The mobile communication terminal of claim 14, wherein the processor is configured to identify a broadcast frequency based upon the receiver being tuned to the frequency for a predetermined time period.

27. A recording unit for remotely recording broadcast programming in response to signals received from a mobile communication terminal, comprising:
 an interface adapted to provide a communication link to a wireless communication network;
 a receiver for tuning to broadcast radio frequencies and receiving broadcast programming;
 a memory; and
 a processor configured to, in response to one or more signals transmitted by a mobile communication terminal via the wireless communication network:
  determine a broadcast frequency from at least one of the one or more signals on which the mobile communication terminal received a broadcast program,
  tune the receiver to the broadcast frequency identified by the mobile communication terminal, and
  store in the memory at least a portion of the broadcast program being transmitted on the broadcast frequency.

28. The recording unit of claim 27, wherein the one or more signals comprise an activation signal, and wherein the processor is configured to tune to the identified broadcast frequency in response the activation signal.

29. The recording unit of claim 28, wherein the memory comprises a buffer memory, and wherein the processor is configured to commence, in response to the activation signal, writing programming received on the broadcast frequency into the buffer memory.

30. The recording unit of claim 29, wherein the one or more signals further comprise first and second recording signals, and wherein the processor is further configured to:
 transmit to the mobile communication terminal, in response to the first recording signal and via the communication link, a portion of the buffer memory contents, and
 mark, in the buffer memory and in response to the second recording signal, a starting point for the at least a portion of a broadcast program.

31. The recording unit of claim 29, wherein the processor is further configured to automatically identify, in response to a recording signal transmitted by the mobile communication terminal subsequent to commencement of the at least a portion of a broadcast program, a start point in the buffer memory contents, the start point corresponding to the commencement of the at least a portion of a broadcast program.

32. The recording unit of claim 31, wherein the memory further includes a storage memory, and wherein the processor is further configured to automatically store in the storage memory a portion of the buffer memory contents written subsequent to the writing of the start point.

33. The recording unit of claim 31, wherein the memory further includes a storage memory, and wherein the processor is further configured to:
- automatically identify the conclusion of the at least a portion of a broadcast program, and
- store in the storage memory substantially the entire at least a portion of a broadcast program.

34. A machine-readable medium having machine-executable instructions for performing steps comprising:
- receiving one or more signals from a mobile communication terminal via a wireless communication network, wherein the one or more signals includes a broadcast frequency on which the mobile communication terminal is receiving a broadcast program;
- tuning, in response to the one or more signals transmitted by the mobile communication terminal, a receiver of a recording unit to the broadcast frequency identified by the one or more signals; and
- storing in a memory at least a portion of the broadcast program being transmitted on the identified broadcast frequency.

35. The machine-readable medium of claim 34, wherein the one or more signals comprise an activation signal, and wherein tuning the receiver comprises tuning to the identified broadcast frequency in response the activation signal.

36. The machine-readable medium of claim 35, wherein storing in a memory comprises writing programming received on the identified broadcast frequency into a buffer memory.

37. The machine-readable medium of claim 36, comprising further machine-executable instructions for performing the steps of:
- transmitting to the mobile communication terminal via a communication link to the wireless network, in response to a first recording signal from the mobile communication terminal, a portion of the buffer memory contents; and
- marking, in the buffer memory and in response to a second recording signal from the mobile communication terminal, a starting point for the at least a portion of a broadcast program.

38. The machine-readable medium of claim 36, comprising further machine-executable instructions for performing the step of automatically identifying, in response to a recording signal transmitted by the mobile communication terminal subsequent to commencement of the at least a portion of a broadcast program, a start point in the buffer memory contents, the start point corresponding to the commencement of the at least a portion of a broadcast program.

39. The machine-readable medium of claim 38, comprising further machine-executable instructions for performing the step of automatically storing in a storage memory a portion of the buffer memory contents written subsequent to the writing of the start point.

40. The machine-readable medium of claim 38, comprising further machine-executable instructions for performing the steps of:
- automatically identifying the conclusion of the at least a portion of a broadcast program, and
- storing in a storage memory substantially the entire at least a portion of a broadcast program.

41. A system for remotely recording audio broadcasts, comprising: a mobile communication terminal, including:
- a communications interface adapted to provide two-way communication between the mobile communication terminal and other locations via a wireless communication network,
- an input device,
- a receiver for tuning to broadcast radio frequencies and receiving a broadcast program broadcast on one of the frequencies, and
- a processor configured to:
  - transmit an activation signal identifying a broadcast frequency to which the terminal receiver is tuned and on which the terminal receiver is receiving the broadcast program,
  - transmit a first manual recording signal,
  - replay a portion of the broadcast program received in response to the first manual recording signal,
  - transmit a second manual recording signal identifying the broadcast program start point within the replayed portion,
  - transmit a stop recording signal, and
  - transmit an automatic recording signal; and
- a recording unit for remotely recording broadcast programming received by the mobile communication terminal and in response to signals received from the mobile communication terminal, the recording unit including:
  - an interface adapted to provide a communication link to the wireless communication network,
  - a receiver for tuning to broadcast radio frequencies and receiving the broadcast program,
  - a buffer memory,
  - a storage memory, and
  - a processor configured to:
    - tune the recording unit receiver to the broadcast frequency identified in the activation signal,
    - commence, in response to the activation signal, writing at least a portion of the broadcast program into the buffer memory,
    - transmit to the mobile communication terminal, in response to the first manual recording signal and via the communication link, a portion of the buffer memory contents,
    - mark in the buffer memory contents, in response to the second manual recording signal, the starting point of the broadcast program,
    - identify in the buffer memory contents, in response to the automatic recording signal, a start point of the broadcast program,
    - identify the conclusion of the broadcast program, and
    - store in the storage memory substantially the entire broadcast program.

* * * * *